(12) United States Patent
Mackman

(10) Patent No.: US 11,176,291 B2
(45) Date of Patent: Nov. 16, 2021

(54) ROUGHING TOOLPATH SEQUENCES GENERATION FOR COMPUTER AIDED MANUFACTURING

(71) Applicant: Autodesk, Inc., San Rafael, CA (US)

(72) Inventor: Stephen William Mackman, Birmingham (GB)

(73) Assignee: Autodesk, Inc., San Rafael, CA (US)

( * ) Notice: Subject to any disclaimer, the term of this patent is extended or adjusted under 35 U.S.C. 154(b) by 592 days.

(21) Appl. No.: 16/107,487

(22) Filed: Aug. 21, 2018

(65) Prior Publication Data

US 2020/0065446 A1 Feb. 27, 2020

(51) Int. Cl.
*G06F 30/23* (2020.01)
*G05B 19/4069* (2006.01)
(Continued)

(52) U.S. Cl.
CPC ............. *G06F 30/23* (2020.01); *G05B 17/00* (2013.01); *G05B 19/4069* (2013.01); *G05B 2219/50209* (2013.01); *G06F 2119/18* (2020.01)

(58) Field of Classification Search
CPC .......... G06F 30/23; G06F 2219/18; G06F 2119/50209; G05B 17/00; G05B 19/4069
See application file for complete search history.

(56) References Cited

U.S. PATENT DOCUMENTS 6,400,998 B1 * 6/2002 Yamazaki ............ G05B 19/401
318/568.1

2010/0058588 A1 * 3/2010 Heinz ................. C03C 10/0027
29/896.1
(Continued)

FOREIGN PATENT DOCUMENTS

EP 3582044 A1 * 12/2019 ......... G05B 19/4099

OTHER PUBLICATIONS

Balasubramaniam, "Tool selection and path planning in 3-axis rough machining", 1999, pp. 42-43.*
(Continued)

*Primary Examiner* — Kamini S Shah
*Assistant Examiner* — Peter Pham
(74) *Attorney, Agent, or Firm* — Fish & Richardson P.C.

(57) ABSTRACT

Methods, systems, and apparatus, including medium-encoded computer program products, for computer aided design and manufacture of physical structures using roughing toolpath sequences generated for subtractive manufacturing include, in one aspect, a method including: obtaining 3D models of a part and a workpiece and information regarding different cutting tools and cutting data therefor; determining a set of candidate combinations of the different cutting tools to effect the roughing operations by estimating a target machining result for each of multiple, tool-size-ordered lists of the different cutting tools; generating an expanded set of combinations of the different cutting tools to effect the roughing operations by adding variations of the candidate combinations; populating a multidimensional roughing operations representation vector using the expanded set of combinations; optimizing values of the multidimensional roughing operations representation vector using simulation of the roughing operations; and providing specified tool selections and operational parameters for use in roughing the part.

20 Claims, 5 Drawing Sheets

(51) Int. Cl.
  *G05B 17/00*   (2006.01)
  *G06F 119/18*  (2020.01)

(56) References Cited

U.S. PATENT DOCUMENTS

2012/0220194 A1*  8/2012  Maloney ............... B24B 37/04
                                                                451/5
2018/0107186 A1*  4/2018  Brown ............... G05B 19/4086

OTHER PUBLICATIONS

Arezoo et al., "Selection of cutting tools and conditions of machining operations using an expert system," Computers in Industry (2000) 42:43-58.
Bey et al., "Optimization of the roughing operation of sculptured surfaces based on offset contours and feedrate adaptation," (Dec. 1, 2017) [online] (retrieved from https://www.researchgate.net/publication/321421643_Optimization_of_the_Roughing_Operation_of_Sculptured_Surfaces_Based_on_Offset_Contours_and_Feedrate_Adaptation?enrichId=rgreq-f7365cc437b8bd97d3c040febf811176-XXX&enrichSource=Y292ZXJQYWdlOzMyMTOyMTY0MztBUzo1NjY3MDg5MDI2MDA3MDRAMTUxMjEyNTMzOTAwMA%3D%3D&el=1_x_2&_esc=publicationCoverPdf), 17 pages.
Chatelain et al., "Development of a spiral trajectory for high speed roughing of light alloy aerospace components," WSEAS Transactions on Applied and Theoretical Mechanics (2008) 3(3): 83-93.
Chen and Fu, "An optimal approach to multiple tool selection and their numerical control path generation for aggressive rough machining of packets with free-form boundaries," Computer-Aided Design (2011) 43:651-663.
Christolear, "Design of Experiments (DOE) Tutorial," (May 22, 2018) [online] (retrieved from http://asq.org/learn-about-quality/data-collection-analysis-tools/overview/design-of-experiments-tutorial.html), 9 pages.
Hider, "CAD/CAM software optimizes roughing with high-feed cutters," (Jul. 13, 2018) [online] (retrieved from https://www.mmsonline.com/products/cadcam-software-optimizes-roughing-with-high-feed-cutters), 2 pages.
Lim et al., "Optimizing tool selection," Int. J. Prod. Res. (2001) 39(6):1239-1256.
Raun, "Rough millings: speed vs. power," (Jul. 13, 2018) [online] (retrieved from https://www.moldmakingtechnology.com/articles/rough-milling-speed-vs-power), 6 pages.
Spanoudakis et al., "Optimal selection of tools for roughing machining of sculptured surfaces," Proceedings of the International Multi Conference of Engineers and Computer Scientists (2008) vol. II, IMECS 2008, Mar. 19-21, 2008, Hong Kong, 6 pages.
Unknown Author, "CAM system optimizes HSM roughing and finishing CNC toolpaths," (Jul. 12, 2018) [online] (retrieved from https://www.mmsonline.com/products/cam-system-optimizes-hsm-roughing-and-finishing-cnc-toolpaths), 2 pages.
Unknown Author, "Latest hyperMILL CAM software features automatic face extension capability," (Jul. 12, 2018) [online] (retrieved from https://news.thomasnet.com/fullstory/latest-hypermill-cam-software-features-automatic-face-extension-capability-40012459), 2 pages.

* cited by examiner

ROUGHING TOOLPATH SEQUENCES GENERATION FOR COMPUTER AIDED MANUFACTURING

BACKGROUND

This specification relates to computer aided design and manufacture of physical structures using subtractive manufacturing systems and techniques.

Computer Aided Design (CAD) software and Computer Aided Manufacturing (CAM) software has been developed and used to generate 3D representations of parts and to manufacture the physical structures of those parts, e.g., using Computer Numerical Control (CNC) manufacturing techniques. Additive manufacturing, also known as solid free form fabrication or three-dimensional (3D) printing, refers to any manufacturing process where 3D parts are built up from raw material (generally powders, liquids, suspensions, or molten solids) in a series of two-dimensional layers or cross-sections. An example of additive manufacturing is Fused Filament Fabrication (FFF). A 3D extrusion printer typically uses FFF to lay down material, such as a plastic filament or metal wire that is unwound from a coil, in layers to produce a 3D printed part.

Further, subtractive manufacturing refers to any manufacturing process where 3D parts are created from stock material (generally a "blank" or "workpiece" that is larger than the 3D part) by cutting away portions of the stock material. Such manufacturing processes typically involve the use of multiple CNC machine cutting tools in a series of operations, starting with a roughing operation, an optional semi-finishing operation, and a finishing operation. During roughing operation(s), large portions of the workpiece are cut away quickly (relative to semi-finishing and finishing operations) using cutting tool(s) of the CNC machining system in order to approximate the final shape of the part being manufactured. Roughing operations are often programmed by experienced machine tool users, but even these experienced users may not be able to readily determine an optimal roughing procedure for a new, complex part to be manufactured.

SUMMARY

This specification describes technologies relating to computer aided design and manufacture of physical structures using roughing toolpath sequences generated for subtractive manufacturing.

In general, one or more aspects of the subject matter described in this specification can be embodied in one or more methods for specifying roughing operations for computer-controlled manufacturing of a part that include: obtaining, in a computer-aided design or manufacturing program, a three dimensional model of the part, a three dimensional model of a workpiece from which to machine the part using a computer-controlled manufacturing system, and information regarding different cutting tools and cutting data for the different cutting tools usable in the computer-controlled manufacturing system, wherein the different cutting tools include cutting tools having different cutting surface geometries, and the information regarding the different cutting tools includes a specified final one of the different cutting tools to use when roughing the part from the workpiece; determining a set of candidate combinations of the different cutting tools to effect the roughing operations by estimating a target machining result for each of multiple, tool-size-ordered lists of the different cutting tools; generating an expanded set of combinations of the different cutting tools to effect the roughing operations by adding to the set of candidate combinations a set of alternative combinations of the different cutting tools, the alternative combinations being variations of the candidate combinations with each variation having at least one candidate tool being replaced with at least one alternate tool; populating a multidimensional roughing operations representation vector using the expanded set of combinations of the different cutting tools; optimizing values of the multidimensional roughing operations representation vector for the expanded set of combinations, using a cost function for the target machining result and simulation of the roughing operations, to specify tool selections and operational parameters for the roughing operations; and providing the specified tool selections and operational parameters for use in roughing the part from the workpiece by the computer-controlled manufacturing system by cutting away portions of the workpiece using the specified tool selections and operational parameters for the computer-controlled manufacturing system.

Obtaining the information regarding the different cutting tools can include receiving user input specifying (i) a set of available tools usable by the computer-controlled manufacturing system as the different cutting tools for the roughing operations, and (ii) which of the tools in the set of available tools to use as the specified final one of the different cutting tools to use when roughing the part from the workpiece. The target machining result can be a total machining time to complete the roughing operations, and the determining can include: estimating machining time for each of the multiple, tool-size-ordered lists of cutting tools to be used for the roughing operations using the cutting data for the different cutting tools; and selecting a portion of the multiple, tool-size-ordered lists having shortest estimated times to be the set of candidate combinations of the different cutting tools.

The estimating can include: calculating, for each respective tool of the different cutting tools other than the specified final cutting tool, (i) a first time to rough the part from the workpiece using the respective tool, (ii) a respective volume of excess material left on the workpiece after roughing with the respective tool, and (iii) a second time to rough the part using the specified final cutting tool on the workpiece after material removal by the respective tool; and using at least two of the respective volumes calculated for the respective tools to estimate a time to rough the part using a second of the respective tools on the workpiece after material removal by a first of the respective tools. The selecting can include selecting tool-size-ordered lists having a fastest five percent of the estimated times for effecting the roughing operations. The different cutting tools can include a family of insert tools having different diameters and metal inserts that create the different cutting surface geometries, and the cutting data can include a feedrate, a maximum stepdown, and a maximum stepover for each of the different cutting tools. The different cutting tools can include a family of solid round tools having different diameters and tip radius that create the different cutting surface geometries, and the cutting data can include a feedrate, a maximum stepdown, and a maximum stepover for each of the different cutting tools, and the calculating can include using a regularized stepdown across the family of solid round tools when calculating the times and material volumes left on the workpiece.

The alternative combinations can be variations of the candidate combinations with each variation having at least one candidate tool being replaced with at least one alternate tool that is within a predefined distance of the at least one candidate tool in a tool-size-ordered list of all the different cutting tools, and generating the expanded set of combinations of the different cutting tools includes generating the alternative combinations using an integer distance value for tool replacements applied to the candidate combinations, the integer distance value being the predefined distance having been predefined by a user. The populating can include populating the multidimensional roughing operations representation vector using the expanded set of combinations of the different cutting tools and one or more roughing parameter alternatives. The one or more roughing parameter alternatives can include tip radius, off-setting type, stepdown, and stepup. Optimizing the values of the multidimensional roughing operations representation vector can include using a design of experiments optimization process. Moreover, the computer-controlled manufacturing system can include one or more computer processing apparatus including at least one non-transitory computer-readable medium encoding the computer aided design or manufacturing program.

Thus, one or more aspects of the subject matter described in this specification can be embodied in a non-transitory computer-readable medium encoding instructions operable to cause data processing apparatus to perform operations for specifying roughing operations for computer-controlled manufacturing of a part, in accordance with the one or more methods. Likewise, one or more aspects of the subject matter described in this specification can be embodied in one or more systems including: a data processing apparatus including at least one hardware processor; and a non-transitory computer-readable medium encoding instructions of a computer-aided design or manufacturing program for specifying roughing operations for computer-controlled manufacturing of a part, the instructions being configured to cause the data processing apparatus to obtain a three dimensional model of the part, a three dimensional model of a workpiece from which to machine the part using a computer-controlled manufacturing system, and information regarding different cutting tools and cutting data for the different cutting tools usable in the computer-controlled manufacturing system, wherein the different cutting tools include cutting tools having different cutting surface geometries, and the information regarding the different cutting tools includes a specified final one of the different cutting tools to use when roughing the part from the workpiece, determine a set of candidate combinations of the different cutting tools to effect the roughing operations by estimating a target machining result for each of multiple, tool-size-ordered lists of the different cutting tools, generate an expanded set of combinations of the different cutting tools to effect the roughing operations by adding to the set of candidate combinations a set of alternative combinations of the different cutting tools, the alternative combinations being variations of the candidate combinations with each variation having at least one candidate tool being replaced with at least one alternate tool, populate a multidimensional roughing operations representation vector using the expanded set of combinations of the different cutting tools, optimize values of the multidimensional roughing operations representation vector for the expanded set of combinations, using a cost function for the target machining result and simulation of the roughing operations, to specify tool selections and operational parameters for the roughing operations, and provide the specified tool selections and operational parameters for use in roughing the part from the workpiece by the computer-controlled manufacturing system by cutting away portions of the workpiece using the specified tool selections and operational parameters for the computer-controlled manufacturing system.

Moreover, the instructions encoded in the non-transitory computer-readable medium of the system can be configured to cause the data processing apparatus to perform all the operations of the one or more methods. Likewise, the system can include the computer-controlled manufacturing system used to build a physical structure of the part in accordance with the three dimensional model of the part.

Particular embodiments of the subject matter described in this specification can be implemented to realize one or more of the following advantages. A user of a machine tool can be assisted in devising roughing operations for manufacturing a given part from a given workpiece. A preferred (optimal or near optimal) sequence of different cutting tools (e.g., solid carbide tools having different diameters) to rough a part can be readily determined based on user input specifying the smallest tool to use at the end of the roughing operations. Goals and metrics can be established for the roughing operations and systematically tested to determine an optimal (or near optimal) set of roughing operations in view of a given set of available cutting tools. Moreover, the systems and technique described are readily parallelizable in that significant portions of the processes described can be performed in parallel on two or more computer processors.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
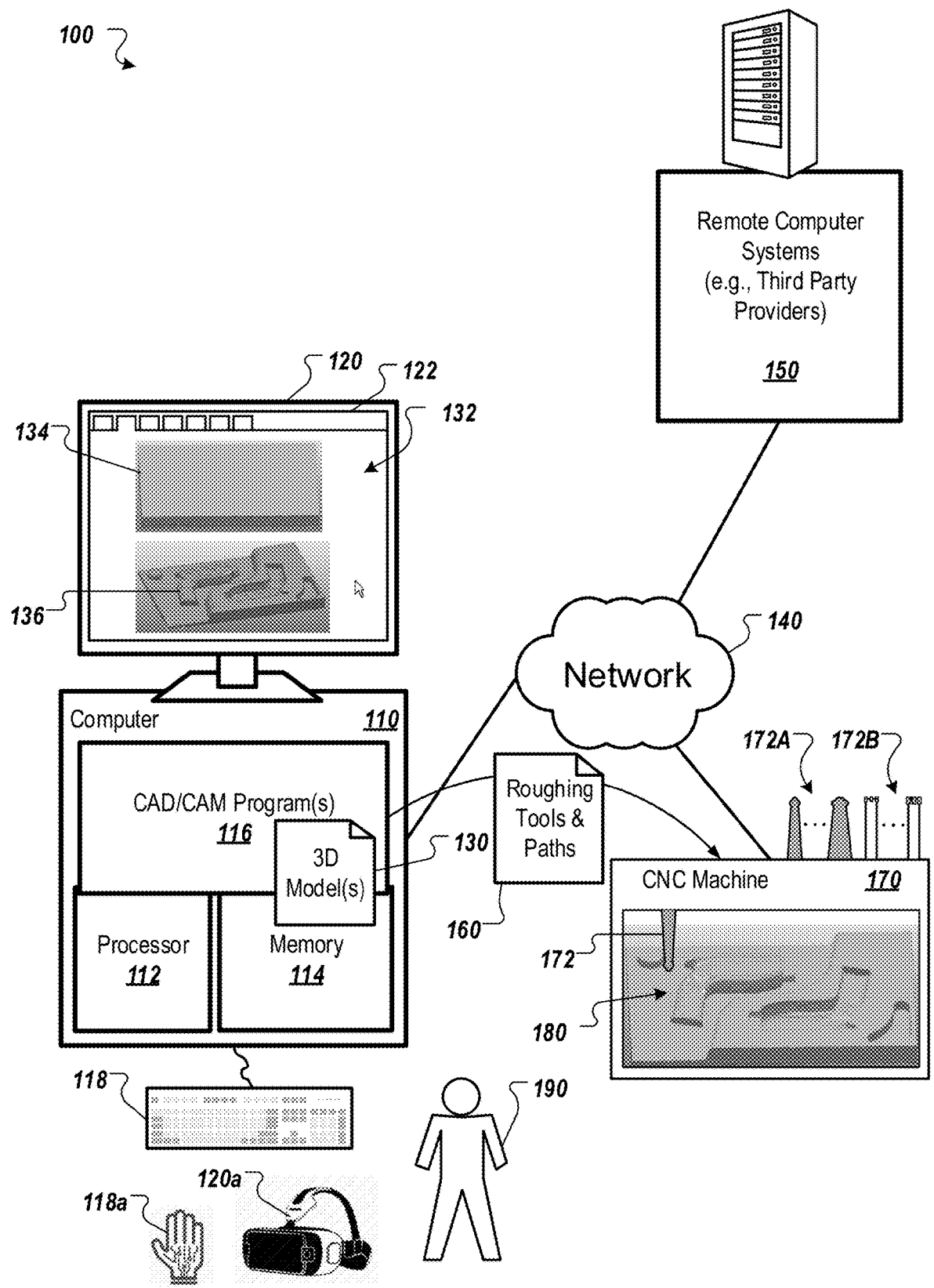
FIG. 1 shows an example of a system usable to design and manufacture physical structures.

FIG. 1 shows an example of a system 100 usable to design and manufacture physical structures. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs include one or more 3D modeling, simulation and manufacturing control programs such as Computer Aided Design (CAD) and/or Computer Aided Manufacturing (CAM) program(s) 116, also referred to as Computer Aided Engineering (CAE) programs, etc. The program(s) 116 can run locally on computer 110, remotely on a computer of one or more remote computer systems 150 (e.g., one or more third party providers' one or more server systems accessible by the computer 110 via the network 140) or both locally and remotely. The one or more remote computer systems 150 can be from an on demand cloud computing platform and can include virtual servers. The CAD/CAM program 116 presents a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer or in a virtual reality (VR) or augmented reality (AR) system. For example, the input/output devices 118, 120 can include a VR input glove 118a and a VR headset 120a.

A user 190 can interact with the program(s) 116 to create and/or load a 3D model 132 (e.g., from a document 130) of a part to be manufactured by a computer-controlled manufacturing system, e.g., by a CNC machine 170, such as a multi-axis, multi-tool milling machine. This can be done using known graphical user interface tools, and the 3D model 132 can be defined in the computer using various known 3D modeling formats, such as using solid models (e.g., voxels) or surface models (e.g., B-Rep (Boundary Representation), surface meshes). In addition, the user 190 can interact with the program(s) 116 to modify the 3D model 132 of the part, as needed.

Once the 3D model 132 of the part is ready to manufacture, the 3D model 132 can be prepared for manufacturing the physical structure of the part by generating toolpaths for use by the computer-controlled manufacturing system to manufacture the part. For example, the 3D model 132 can be used to generate a toolpath specification document 160, which can be sent to the CNC machine 170 and used to control operation of different milling tools. This can be done upon request by the user 190, or in light of the user's request for another action, such as sending the 3D model 132 to the CNC machine 170, or other manufacturing machinery, which can be directly connected to the computer 110, or connected via a network 140, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

While the toolpath specification document 160 can include finishing toolpaths and optional semi-finishing toolpaths, the present application focuses on facilitating generation of roughing toolpath sequences for roughing out the part from a workpiece, before any semi-finishing operations and before the finishing operations. Thus, the 3D model 132 includes a 3D model 134 of the workpiece from which the part will be cut, in addition to a 3D model 136 of the part that is to be cut from the workpiece (in this example, the 3D model 136 is that of a housing for a hand drill, but this is but one example, and many different types of parts can be designed and manufactured using the systems and techniques described herein). Likewise, the physical object 180 is shown in the CNC machine 170 after a cutting tool 172 has completed the last roughing toolpath operation, and so the part 180 is not fully formed from the workpiece at this stage of the milling operations; the terracing of the part 180 resulting from the rough cuts out of the workpiece are shown in FIG. 1 since finishing operation(s) have not yet been done.

As will be appreciated, there are many different types of cutting tools 172 that may be available in the CNC machine 170. These different cutting tools 172 can include solid tools having different diameters and tip radius (e.g., solid carbide round tools) that create different cutting surface geometries for the tools 172 and/or insert tools having different diameters and metal (e.g., carbide) inserts that create different cutting surface geometries for the tools 172. These different tools 172 can be arranged in tool families, where a tool family has one or more shared tool characteristics (e.g., a family 172A of solid carbide round tools having different diameters and tip radius that create the different cutting surface geometries, and a family 172B of insert tools having different diameters and metal inserts that create different cutting surface geometries). Cutting tools can include end mill tools with different diameters, tip (or insert) shapes, and radii.

Given the number of available tools in a typical CNC machine, there are many different possible combinations of tool sequences that could be used to do the roughing operations to form the part 180 from the workpiece. To assist the user 190 in developing a manufacturing plan for the part, the program(s) 116 in the system 100 are designed to automatically generate CNC roughing toolpath sequences for the 3D model 132. The system 100 or the user 190 can specify the different cutting tools 172 that are available for use in the CNC machine 170, and from this set of available tools 172, the user 190 specifies which tool to use with the final toolpath(s) at the end of the roughing operation. Note that the sequence of tools used in the roughing should generally be in tool-size order, from largest to smallest, so the user specified final cutting tool 172 will be the smallest tool to be used during the roughing, which likewise specifies (by virtue of the details of the geometry and operation of the cutting tool) how much excess stock will be left on the workpiece after the roughing operation.

The program(s) 116 use the information regarding the available tools 172, and the specified final tool 172, plus cutting data for the available tools (e.g., volume removal rates and/or data from which volume removal rates can be calculated, such as a feedrate, a maximum stepdown, and a maximum stepover for each of the different cutting tools 172) to estimate one or more criteria by which different roughing tool sequences can be compared (note that the maximum stepdown can vary within a tool family, such as based on how far inserts extend up the length of a tool in a family of insert tools). Then, using these estimates, the program(s) 116 compare different combinations of tool sequences to select a set of candidate combinations of the different cutting tools 172, which can then be investigated in more detail, using computer simulation of the roughing operations.

The one or more criteria by which different roughing tool sequences are compared can include time to machine the part and/or costs of the tools. Note that it is preferred to use lower cost tools, when possible, since the cutting tools wear out over time and need to be replaced (the tool is fully replaced or remanufactured in the case of solid tools, and the cutting edges are reoriented, replaced or remanufactured in the case of insert tools). With the goal(s) of the one or more criteria set, a metric can be defined by which achievement of those goal(s) can be measured with a cost function. Moreover, using this cost function, the program(s) 116 can minimize this cost function to optimize the one or more criteria.

For example, the various possible ways of machining the part can be expressed in the program(s) 116 as a multidimensional mathematical vector, and the cost metric can be expressed as a function on this multidimensional vector. The program(s) 116 can then search for an optimal solution for the different combinations of cutting tools 172 for the roughing operation by using cost metric optimization techniques to minimize the cost metric while ensuring any required rule(s) are kept (e.g., a rule about how much excess stock is left after the roughing, which can be ensured by finishing with the user specified final cutting tool). The cost metric optimization techniques performed on the multidimensional vector, which expresses how the part is roughed from the workpiece, can include a downhill optimization process to locally optimize each solution, a design of experiments optimization process, or other optimization processes.

In any case, the program(s) 116 specify tool selections and operational parameters for the roughing operations for the 3D model 132. These specified tool selections and operational parameters can be provided in a document 160 to the CNC machine 170 for use in roughing the part 180 from the workpiece by the CNC machine 170. Thus, the document 160 can include roughing toolpaths (and potentially also semi-finishing and finishing toolpaths) provided by the program(s) 116 (in an appropriate format) to the CNC machine 170 to create the physical structure of the part 180. Note that in some implementations, the computer 110 is integrated into the CNC machine 170, and so the document 160 is created by the same computer that will use the document 160 to manufacture the part 180.

Figure 2:
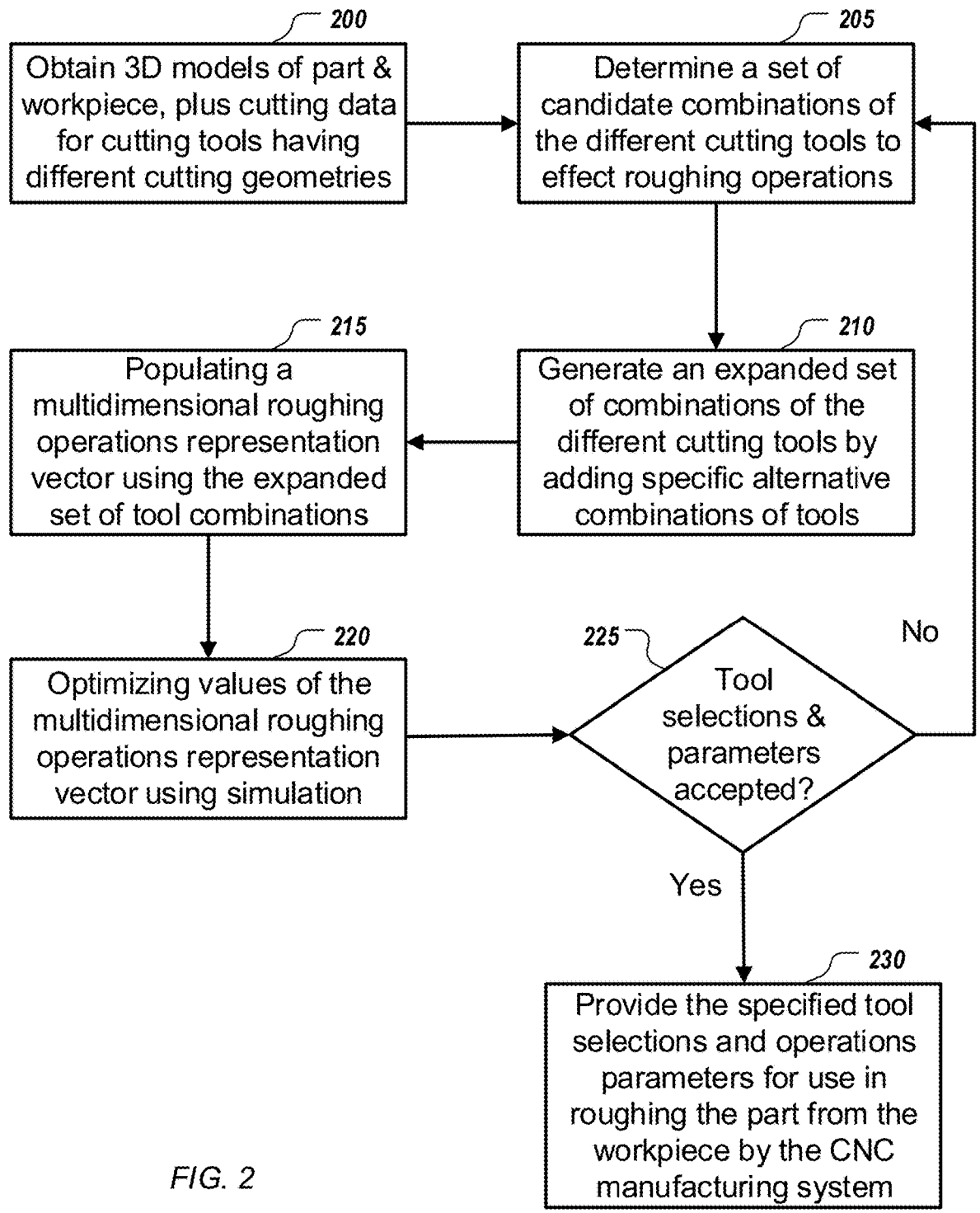
FIG. 2 shows an example of a process to specify roughing operations for computer-controlled manufacturing of a part.

FIG. 2 shows an example of a process to specify roughing operations for computer-controlled manufacturing of a part. A 3D model of the part, a 3D model of a workpiece from which to machine the part using a computer-controlled manufacturing system, and information regarding different cutting tools and cutting data for the different cutting tools usable in the computer-controlled manufacturing system are obtained 200 in a computer-aided design or manufacturing program. As described above, the 3D models of the part and the workpiece can be loaded from a file or created by a user (e.g., user 190 using program 116 on computer 110). Further, the information regarding different cutting tools and cutting data for the different cutting tools can be provided by the user or obtained from another source.

For example, in some implementations, user input is received that specifies a set of available tools usable by the computer-controlled manufacturing system as the different cutting tools for the roughing operations. In some implementations, the set of available tools is determined automatically by the system, e.g., by program 116 on computer 110. Moreover, note that the tools considered to be available can vary. For example, the available tools can be the ones currently loaded in the machine tool's automatic tool changer, or the available tools can be the ones in their bench draw. In some implementations, both sets of tools are considered as available, but the system can be programmed to prefer the use of tools in the tool changer and also consider other tools that can replace one or more tools currently in the tool changer, in the event those tools do not facilitate a roughing operation that meets the desired criteria.

In some implementations, the user can provide (or load from another source) definitions of how each tool should be used, including stepdown, stepover, feedrate, and spindle speed. The user can also provide (or load from another source) other parameters to address other issues, such as lead/link definitions, or other parameters useful to describe how to use each tool. Moreover, in some implementations, the user indicates what outcome they wish to optimize, e.g., machining time and/or tool wear.

In any case, the different cutting tools are cutting tools having different cutting surface geometries, which thus have different volume removal rates. Further, the obtained 200 information regarding the different cutting tools includes a specified final one of the different cutting tools to use when roughing the part from the workpiece. For example, given a set of automatically identified available tools, user input is received that specifies which of the available tools in the set to use as the final tool when roughing the part from the workpiece. This is advantageous as the user is likely to already know (or be able to readily determine) the best final (smallest) cutting tool to use for roughing given the 3D model at hand, and since the program need not then identify the best final (smallest) cutting tool to use, a substantial reduction in processing time for the tool selection process can be realized.

A set of candidate combinations of the different cutting tools (to effect the roughing operations) is determined 205 by estimating a target machining result for each of multiple, tool-size-ordered lists of the different cutting tools. In some implementations, the sequence of tools used in the roughing will be in tool-size order, from largest to smallest, since larger tools generally remove more material more quickly. Thus, roughing should generally begin with a larger tool and end with a smaller tool, and so the lists of possible tool combinations are ordered by the size of the tools. As a simple example, if there are four available tools (tool-1, tool-2, tool-3, tool-4) having respective diameters of 8 mm, 12 mm, 16 mm, and 20 mm, then there are seven possible roughing tool combinations (assuming that tool-1 is selected as the final tool and that at least one tool is used before tool-1) as follows:

Tool-size-ordered list one=tool-4, tool-3, tool-2, tool-1;
Tool-size-ordered list two=tool-4, tool-3, tool-1;
Tool-size-ordered list three=tool-4, tool-2, tool-1;
Tool-size-ordered list four=tool-4, tool-1;
Tool-size-ordered list five=tool-3, tool-2, tool-1;
Tool-size-ordered list six=tool-3, tool-1; and
Tool-size-ordered list seven=tool-2, tool-1.

Note that, as the number of available tools increases, the number of possible, size-ordered tool combinations increases even faster.

In some implementations, the target machining result is a total machining time to complete the roughing operations, and the set of candidate combinations of the different cutting tools is determined 205 by estimating the machining time for each of the multiple, tool-size-ordered lists of cutting tools to be used for the roughing operations using the cutting data for the different cutting tools. Note that, in general, doing full simulation to check all results is very expensive in terms of processing time and so is not practical. Thus, the method advantageously involves finding a quick estimate of the likely best solution and checking nearby results using real data to find a preferred solution (e.g., the actual best solution).

Figure 3A:
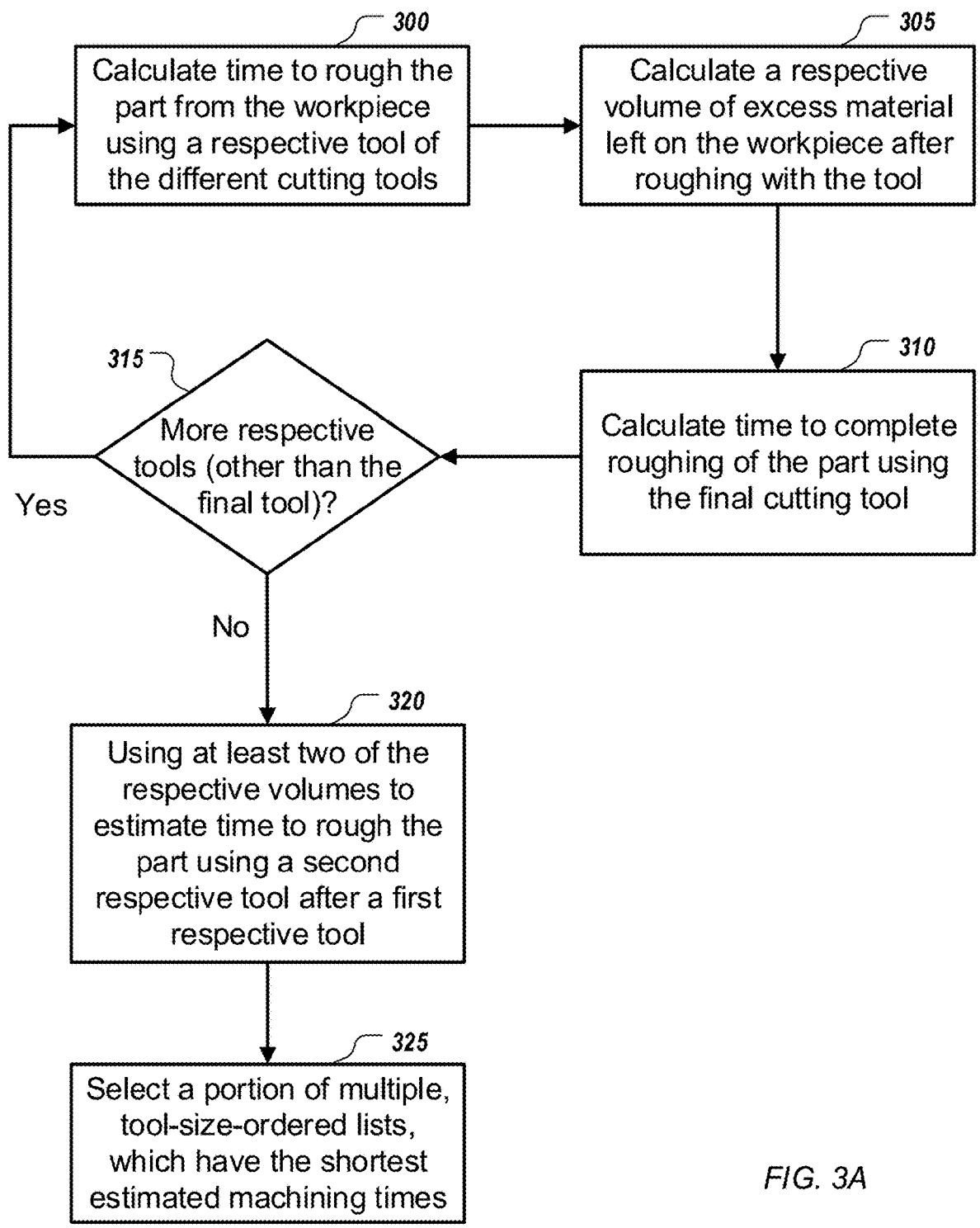
FIG. 3A shows an example of a process to determine a set of candidate combinations of different cutting tools to effect roughing operations by estimating a total machining time to complete the roughing operations.

FIG. 3A shows an example of a process to determine a set of candidate combinations of different cutting tools to effect roughing operations by estimating a total machining time to complete the roughing operations. To obtain the quick estimate, toolpaths for each available tool can be calculated, followed by the rest roughing toolpath of the final tool; for each toolpath, machining time and remaining stock volume can be found; and from these calculated values, the machining time for any number of toolpaths to machine the part can be estimated.

Calculations are performed for each respective tool of the different cutting tools other than the specified final cutting tool. A first time to rough the part from the workpiece is calculated 300 using the respective tool, and a respective volume of excess material left on the workpiece after roughing with the respective tool is calculated 305. This is a straight forward, and relatively quick simulation process since the 3D model of the workpiece is known and conventional CAD/CAM programs can be used to calculate the toolpaths for the respective tool and to simulate machining the part from the workpiece using the respective tool. The simulation can use step cutting for these toolpaths, with a single intermediate slice or two or more intermediate slices. Also note that a regularized stepdown can be used across a family of tools when calculating the times and material volumes left on the workpiece. The result of this process is the machining time and the stock volume left on the workpiece after machining by the respective tool.

A second time to rough the part is calculated 310 using the specified final cutting tool (e.g., an 8 mm ball nosed cutting tool with a 0.8 mm stepdown, 2.4 mm stepover, and 400 mm/min no step cutting) on the workpiece after material removal by the respective tool (e.g., each of the other respective tools when there are two or more respective tools). Once again, this is a straight forward, and relatively quick simulation process since the stock volume left on the workpiece is known (as a result of the calculating 305) and conventional CAD/CAM programs can be used to calculate the toolpaths for the final tool and to simulate machining the part from the stock volume left on the workpiece (after machining by the respective tool) using the final tool. The result of this process is the machining time for cutting away (using the final tool) the stock left on the workpiece after machining by the respective tool.

While additional respective cutting tools (other than the final tool) remain 315, further calculations are made. Once the calculations are completed 315 for the respective tools, at least two of the respective volumes calculated for the respective tools are used 320 to estimate a time to rough the part using a second of the respective tools on the workpiece after material removal by a first of the respective tools. For example, consider a three tool machining case, where Tool1 is the largest tool, Tool2 is an intermediate sized tool, and Tool3 is the final, smallest tool used for the roughing operations. Define:

Time(Tool$A$,Stock$B$)→Time to machine with Tool$A$ from Stock$B$, and,

TotalTime=Time(Tool1,Block)+Time(Tool2,Tool1Stock)+Time(Tool3,Tool2Stock).

TotalTime=Time(Tool1,block)+Time(Tool2,Tool1Stock)+Time(Tool3,Tool2Stock)

As noted above, using traditional CAD/CAM programs, both Time(Tool1, Block) and Time(Tool3, Tool2Stock) are readily obtainable, and what remains is the calculation of Time(Tool2, Tool1Stock).

Since all that is needed is an estimate, an assumption can be made that volume removal rates are the same for the rest roughing toolpaths (e.g., machining with Tool2 from the stock left after machining with Tool1) as for the initial roughing toolpaths (e.g., machining with Tool2 from the Block, i.e., from the original workpiece). Thus, an estimated time can be determined using:

$$\text{Time}(Tool2, Tool1Stock) = \frac{\text{Time}(Tool2, \text{Block})[\text{Volume}(Tool1Stock) - \text{Volume}(Tool2Stock)]}{\text{Volume}(\text{Block}) - \text{Volume}(Tool2Stock)}.$$

Using these types of calculations, time estimates can be determined for multiple, tool-size-ordered lists of all the different combinations of the available tools, which combinations proceed in tool-sized order and end with the predefined smallest cutting tool.

Further, it should be noted that, while a detailed example of a three tool case is described, the estimation process allows the time of any number of tools to be estimated. For instance, in a 4 tool case, if Tool4 is the designated final tool then, TotalTime=Time(Tool1,Block)+Time(Tool2,Tool1Stock)+Time(Tool3,Tool2Stock)+Time(Tool4,Tool3Stock)

and the remaining calculations proceed as before. In some implementations, a range of numbers of tools to be used can be decided, e.g., minimum of 3, and maximum of 5, and the algorithm can be used to estimate every combination of tools in the range, e.g., estimate every combination for 3, 4 and 5 tools. Note that the estimates can be calculated quickly, and once the best estimates are selected, the process carries on as described herein. However, estimates between different numbers of tools may not be appropriately compared with each other, as the inaccuracies can be very different for the different numbers of total tools. Thus, in some implementations, the best of the respective tool number estimates (e.g., the best of the 3 tool estimates, the best of the 4 tool estimates, and the best of the 5 tool estimates) are selected for further processing.

Figures 3B, 3C, 3D:
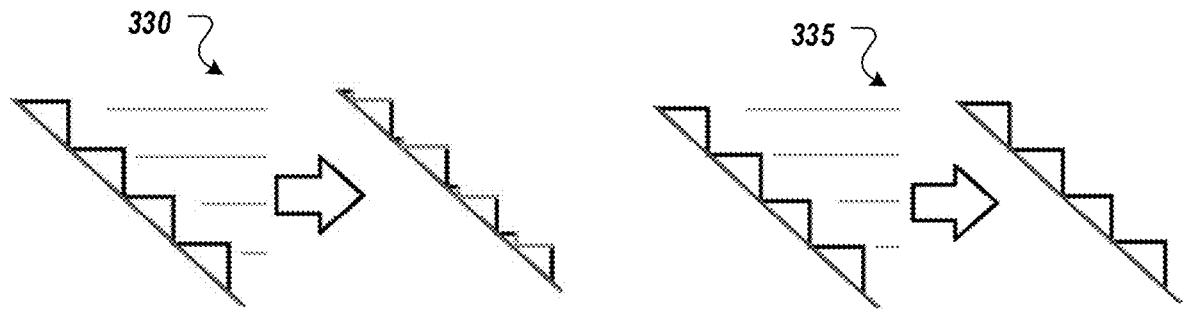
FIG. 3B compares rest roughing operations with non-aligned versus aligned slices.
FIG. 3C shows an example of estimated times for a subset of candidate combinations of cutting tools.
FIG. 3D shows the chart from FIG. 3C with the candidate tool combination expanded by a taxi-cab distance of two.

In addition, because different tools can have different stepdowns, the stepdown can be regularized across a set of tools to improve the estimated times. FIG. 3B compares rest roughing operations with non-aligned slices 330 versus aligned slices 335. As shown, using tools with different stepdowns can make the time predictions more difficult because the simulated roughing with non-aligned slices 330 can introduce noise due to the unpredictability of the steps. By regularizing the stepdowns (normalizing by using the same stepdown across tools) to use aligned slices 335, the amount of noise in the results can be reduced. In some implementations, the stepdown of the largest roughing tool is used; in general, using a smaller stepdown gives a more accurate estimate across tool diameters because this reduces the variation in removal rates across the tools that use different stepdowns.

In addition, the time taken can be adjusted by an empirically determined factor to compensate for the time loss/gain (a time compensation factor to assist in producing a time estimate that corresponds with a real stepdown). For example, if a roughing tool has a stepdown of 2 mm, a toolpath with that tool is calculated, but with a stepdown of 1 mm, and it is found that the toolpath takes a time of 2 min to machine. Because the calculated toolpath is taking only half the depth of cut, it has only half the material removal rate of the real toolpath. Base on this, it can be estimated that the toolpath would take 1 min to machine. In general say a roughing tool has a stepdown of s1, and a toolpath with that tool is calculated with a stepdown of s2, and it takes a time t2 to machine. Then, it can be estimated that the time for the tool with the real stepdown of s1 will be: Time=t2*s2/s1. Using this approach, more accurate time estimates can be achieved.

Returning to FIG. 3A, after estimating the times to rough the part, a portion of the multiple, tool-size-ordered lists having shortest estimated times are selected 325 to be the set of candidate combinations of the different cutting tools. For example, from the set of all the tool-size-ordered lists of tools to use, the tool-size-ordered lists having a fastest five percent of the estimated times for effecting the roughing operations are selected. Other cutoffs can also be used, such as the fastest ten percent or the fasted fifteen percent. Moreover, in some implementations, the target machining result is a total tooling cost, or the target machining result includes both the total machining time and the total tooling cost.

Returning to FIG. 2, the set of candidate combinations of the different cutting tools resulting from the estimation process is a proper subset of all the possible tool combinations that can be made from the available cutting tools to effect the roughing operations. This proper subset of the tool combinations represents a rough estimate of the tool combinations that will optimize the target machining result (e.g., total machining time). However, while the estimating process has the advantage of quickly finding generally good candidate combinations, the estimating processing may not find the best combination of the different cutting tools. Thus, the estimating is used as an initial pass to narrow the search space for subsequent simulation to find a preferred (optimal or nearly optimal) combination of the different cutting tools to effect the roughing operations.

An expanded set of combinations of the different cutting tools is generated 210 by adding to the initial set of candidate combinations a set of alternative combinations of the different cutting tools. The alternative combinations are variations of the candidate combinations with each variation having at least one candidate tool being replaced with at least one alternate tool that is within a predefined size-ordinal distance of the at least one candidate tool in a tool-size-ordered list of all the different cutting tools. For example, the expanding 210 of the set of candidate combinations can involve generating the alternative combinations using a taxi-cab distance of one, two or three for tool replacements applied to the candidate combinations.

FIG. 3C shows an example of estimated times for a subset of candidate combinations of cutting tools. A chart 340 shows estimated times for machining a part from a workpiece using three tools selected from a set of nine available cutting tools (e.g., a 20 mm diameter tool, a 25 mm diameter tool, a 32 mm diameter tool, a 40 mm diameter tool, a 50 mm diameter tool, a 63 mm diameter tool, an 80 mm diameter tool, a 100 mm diameter tool, and a 125 mm diameter tool). A vector <t1, t2, . . . tn> can represent machining with n+1 tools, t, with the given diameters, ending in tool zero, which is fixed and so not denoted in the vector. Note that t1>t2> . . . >tn, in terms of size, and n is less than the number of available tools (nine tools in this example). The vector will evaluate to a number that represents the outcome that is being optimized (e.g., minimizing machining time), and by calculating the vector with the minimal evaluation, an associated series of tools can be determined for the roughing of the part from the workpiece.

Using this nomenclature, a two dimensional matrix <i,j>, with 0<i<j<=8, represents the various options for selecting two tools to be used before the final tool zero. An example of such a two dimensional matrix, <i,j>, is shown in chart 340, where i=2, 3, . . . , 8 represents the first tool selected for the roughing operations, and j=1, 2, 3, . . . , 7 represents the second tool selected for the roughing operations, before the final tool 0 is used. As shown, each co-ordinate in the two dimensional matrix has an estimated machining time associated with that combination of tools. In the example shown, the estimated optimal vector is <5,4> with machining time 33.64391 minutes, which represents starting the machining with tool 5, then machining with tool 4, and finally machining with tool 0, i.e., choosing the 63 mm diameter tool followed by the 32 mm diameter tool followed by the 20 mm diameter tool. However, as noted above, these times are just estimates, and so the <5,4> combination of cutting tools may not in fact be the fastest option.

Expanding this candidate tool combination by a taxi-cab distance of one will add to the set of candidate combinations the <6,4> tool combination and the <5,3> tool combination. Note that a pure taxi-cab distance of one would also normally include tool combinations <4,4> and <5,5>, but since these violate the tool-size-ordered requirement for the list of different cutting tools to use (e.g., 0<i<j<=8) these potential combinations are not included in the taxi-cab distance measure.

As another example, FIG. 3D shows the chart 340 from FIG. 3C with the candidate tool combination expanded 345 by a taxi-cab distance of two. Note that all tool combinations that do not satisfy the tool-size-ordered requirement are not considered as options (i.e., no time estimates are shown along the diagonal line or in the upper right corner of the chart 340). Thus, any cell in the chart 340 that does not obey the tool-size-ordered list requirement is removed from the taxi-cab distance of two, expanded set of tool combinations. Thus, the expansion adds to the set of candidate tool combinations the following alternative tool combinations:

a)<5,2>, i.e., replacing tool 4 with tool 2 (estimated time=34.22541);

a)<4,3>, i.e., replacing tools 5 & 4 with tools 4 & 3 (estimated time=40.00155);

a)<5,3>, i.e., replacing tools 5 & 4 with tools 5 & 3 (estimated time=37.08923);

a)<6,3>, i.e., replacing tools 5 & 4 with tools 6 & 3 (estimated time=40.08068);

a)<6,4>, i.e., replacing tool 5 with tool 6 (estimated time=35.97842);

a)<7,4>, i.e., replacing tool 5 with tool 7 (estimated time=34.73587);

a)<6,5>, i.e., replacing tools 5 & 4 with tools 6 & 5 (estimated time=34.74378).

In some implementations, rather than a taxi-cab distance of one or two, the predefined size-ordinal distance can be a taxi-cab distance of three, or potentially larger integers. Other distance measures are also possible, such as a Euclidean distance measure.

In some implementations, the value of the distance to use is set by the user. Note that there is generally a tradeoff between processing time and the chances of finding the optimal solution. Expanding the set of candidate tool combinations more will increase the chances of finding the optimal solution, but will also increase the time needed to simulate machining the workpiece using all the different tool combinations of the expanded set. In some implementations, parallel processing (e.g., using multiple computers accessible by computer network) is used for simulating the different tool combinations, and so a preferred amount of expansion from the initial tool combinations can vary with the context of the implementation. In some implementations, the alternate combinations are chosen repeatedly until a minimum value is found in which no neighboring point in the estimated times is smaller.

The example of FIG. 3D is for three tools selected from nine available tools. As will be appreciated, other combinations of the available tools can also be evaluated to generate initial estimates of machining times for those combinations, such two tool combinations, four tool combinations, five tool combinations, etc. For such cases, the systems and techniques described still apply, e.g., for four tool combinations, the two dimensional matrix becomes a three dimensional matrix, and for five tool combinations, a four dimensional matrix, etc. Moreover, the total number of available tools can be less than nine or more than nine. In any case, once the expanded set of tool combinations is prepared, these candidate tool combinations are then evaluated using simulation.

Returning to FIG. 2, a multidimensional roughing operations representation vector is populated 215 using the expanded set of combinations of the different cutting tools. In addition to the tool combinations, in some implementations, this includes populating 215 the multidimensional roughing operations representation vector with roughing parameter alternative(s). For example, roughing parameter alternatives can include tip radius, off-setting type, stepdown/stepup information, and whether or not to use step cutting. Every new control can introduce a new dimension in the vector to control it. For instance, if a vector <i,j> is being used to control two tools and their radii, and then it is desired (on top of that) to test if step cutting is good or not, a third element is introduced to the vector to test that and now the vector is <i,j,k>. If the question is 'do we put a single step cutting slice in the middle', then k can be either 0 (for no we don't) or 1 (for yes we do). If the question is 'How many step cutting slices should we use', then k can be made the number of step cutting slices, with 0 indicating to not use step cutting. Also, note that reducing the stepdown of specific tools can sometimes reduce the total machining time.

Values of the multidimensional roughing operations representation vector for the expanded set of combinations are then optimized 220 using a cost function for the target machining result, and simulation of the roughing operations, to specify tool selections and operational parameters for the roughing operations. The simulation process can be parallelized (e.g., multiple programs 116) and/or be performed either on the local computer (e.g., computer 110 or CNC machine 170) or on remote computer(s) (e.g., one or more remote computer systems 150). Moreover, the simulation 220 can involve driving each tool at a nominal feed rate, and using this feed rate and the length over which each feed rate is run, the time it takes for each toolpath to be run can be calculated. However, the machine tool may not be able to match the feed rate at any given position because it can't accelerate fast enough, or process the points fast enough or because of other limiting factors. Thus, in some implementations, the simulation 220 takes these issues into account to produce a more accurate time for each toolpath.

In some implementations, the optimization process 220 involves using a downhill optimization process to minimize the cost function (e.g., to minimize machining time). Elements of the vector can be varied in turn to determine which is best, and the optimization process 220 can include multiple iterations. The elements of the multi-dimensional vector can include various value types, such as integer values and Boolean values. Further, in some implementations, the optimization process 220 involves using a design of experiments optimization process. Other optimization processes can also be used. Note that starting point selection is informed by the estimation process described above, and the termination criteria can include checking neighbors to a found solution to confirm that all neighbors have a greater cost function (or are invalid because they don't obey the tool order constraint) Moreover, various parameters can be used and changed during the simulation/optimization 220, such as providing more choice of step cutting stepdown.

In some implementations, once the simulation/optimization 220 is completed, one or more optional sets of tool selections for roughing and operational parameters can be presented to a user for confirmation. If the user is not satisfied 225 with the options, the process can return to determining 205 a new set of candidate combinations of the different cutting tools (e.g., using different input parameters). Once the user is satisfied 225 with determined set of tool selections for roughing, the specified tool selections and operational parameters for use in roughing the part (from the workpiece by the computer-controlled manufacturing system by cutting away portions of the workpiece using the specified tool selections and operational parameters for the computer-controlled manufacturing system) are provided 230. As noted above, the output is an ordered list of tools that ends with the smallest tool defined by the user. It is also possible to output other parameters which do not affect the safety of the roughing, but can affect the efficiency, e.g., reduce stepdown.

Figure 4:
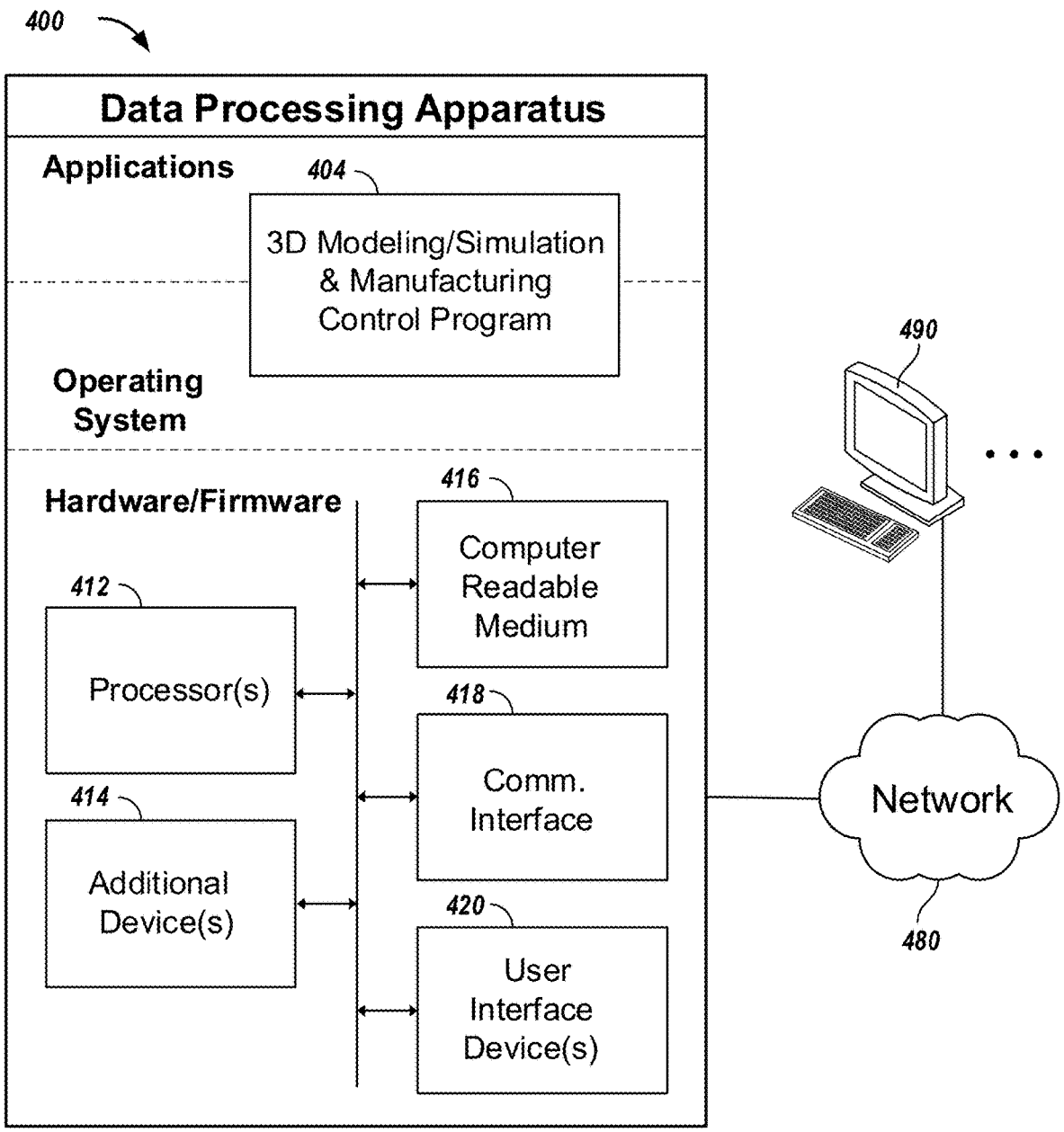
FIG. 4 is a schematic diagram of a data processing system usable to implement the described systems and techniques.

FIG. 4 is a schematic diagram of a data processing system including a data processing apparatus 400, which can be programmed as a client or as a server. The data processing apparatus 400 is connected with one or more computers 490 through a network 480. While only one computer is shown in FIG. 4 as the data processing apparatus 400, multiple computers can be used. The data processing apparatus 400 includes various software modules, which can be distributed between an applications layer and an operating system. These can include executable and/or interpretable software programs or libraries, including tools and services of a 3D modeling/simulation and manufacturing control program 404 that implements the systems and techniques described above. The number of software modules used can vary from one implementation to another. Moreover, the software modules can be distributed on one or more data processing apparatus connected by one or more computer networks or other suitable communication networks.

The data processing apparatus 400 also includes hardware or firmware devices including one or more processors 412, one or more additional devices 414, a computer readable medium 416, a communication interface 418, and one or more user interface devices 420. Each processor 412 is capable of processing instructions for execution within the data processing apparatus 400. In some implementations, the processor 412 is a single or multi-threaded processor. Each processor 412 is capable of processing instructions stored on the computer readable medium 416 or on a storage device such as one of the additional devices 414. The data processing apparatus 400 uses the communication interface 418 to communicate with one or more computers 490, for example, over a network 480. Examples of user interface devices 420 include a display, a camera, a speaker, a microphone, a tactile feedback device, a keyboard, a mouse, and VR and/or AR equipment. The data processing apparatus 400 can store instructions that implement operations associated with the program(s) described above, for example, on the computer readable medium 416 or one or more additional devices 414, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims.

What is claimed is:

1. A computer-implemented method for specifying roughing operations for computer-controlled manufacturing of a part, the method comprising:
    obtaining, in a computer-aided design or manufacturing program, a three dimensional model of the part, a three dimensional model of a workpiece from which to machine the part using a computer-controlled manufacturing system, and information regarding different cutting tools and cutting data for the different cutting tools usable in the computer-controlled manufacturing system, wherein the different cutting tools comprise cutting tools having different cutting surface geometries, and the information regarding the different cutting tools comprises a specified final one of the different cutting tools to use when roughing the part from the workpiece;
    determining a set of candidate combinations of the different cutting tools to effect the roughing operations by estimating a target machining result for each of multiple, tool-size-ordered lists of the different cutting tools;
    generating an expanded set of combinations of the different cutting tools to effect the roughing operations by adding to the set of candidate combinations a set of alternative combinations of the different cutting tools, the alternative combinations being variations of the candidate combinations with each variation having at least one candidate tool being replaced with at least one alternate tool;
    populating a multidimensional roughing operations representation vector using the expanded set of combinations of the different cutting tools;
    optimizing values of the multidimensional roughing operations representation vector for the expanded set of combinations, using a cost function for the target machining result and simulation of the roughing operations, to specify tool selections and operational parameters for the roughing operations; and
    providing the specified tool selections and operational parameters for use in roughing the part from the workpiece by the computer-controlled manufacturing system by cutting away portions of the workpiece using the specified tool selections and operational parameters for the computer-controlled manufacturing system.

2. The method of claim 1, wherein obtaining the information regarding the different cutting tools comprises receiving user input specifying (i) a set of available tools usable by the computer-controlled manufacturing system as the different cutting tools for the roughing operations, and (ii) which of the tools in the set of available tools to use as the specified final one of the different cutting tools to use when roughing the part from the workpiece.

3. The method of claim 1, wherein the target machining result is a total machining time to complete the roughing operations, and the determining comprises:
    estimating machining time for each of the multiple, tool-size-ordered lists of cutting tools to be used for the roughing operations using the cutting data for the different cutting tools; and
    selecting a portion of the multiple, tool-size-ordered lists having shortest estimated times to be the set of candidate combinations of the different cutting tools.

4. The method of claim 3, wherein the estimating comprises:
    calculating, for each respective tool of the different cutting tools other than the specified final cutting tool, (i) a first time to rough the part from the workpiece using the respective tool, (ii) a respective volume of excess material left on the workpiece after roughing with the respective tool, and (iii) a second time to rough the part using the specified final cutting tool on the workpiece after material removal by the respective tool; and
    using at least two of the respective volumes calculated for the respective tools to estimate a time to rough the part using a second of the respective tools on the workpiece after material removal by a first of the respective tools.

5. The method of claim 4, wherein the selecting comprises selecting tool-size-ordered lists having a fastest five percent of the estimated times for effecting the roughing operations.

6. The method of claim 4, wherein the different cutting tools comprise a family of insert tools having different diameters and metal inserts that create the different cutting surface geometries, and the cutting data comprises a feedrate, a maximum stepdown, and a maximum stepover for each of the different cutting tools.

7. The method of claim 4, wherein the different cutting tools comprise a family of solid round tools having different diameters and tip radius that create the different cutting surface geometries, and the cutting data comprises a feedrate, a maximum stepdown, and a maximum stepover for each of the different cutting tools, and wherein the calculating comprises using a regularized stepdown across the family of solid round tools when calculating the times and material volumes left on the workpiece.

8. The method of claim 1, wherein the alternative combinations are variations of the candidate combinations with each variation having at least one candidate tool being replaced with at least one alternate tool that is within a predefined distance of the at least one candidate tool in a tool-size-ordered list of all the different cutting tools, and generating the expanded set of combinations of the different cutting tools comprises generating the alternative combinations using an integer distance value for tool replacements applied to the candidate combinations, the integer distance value being the predefined distance having been predefined by a user.

9. The method of claim 1, wherein the populating comprises populating the multidimensional roughing operations representation vector using the expanded set of combinations of the different cutting tools and one or more roughing parameter alternatives.

10. The method of claim 9, wherein the one or more roughing parameter alternatives comprise tip radius, offsetting type, stepdown, and stepup.

11. The method of claim 1, wherein optimizing the values of the multidimensional roughing operations representation vector comprises using a design of experiments optimization process.

12. The method of claim 1, wherein the computer-controlled manufacturing system comprises one or more computer processing apparatus including at least one non-transitory computer-readable medium encoding the computer aided design or manufacturing program.

13. A system comprising:
a data processing apparatus including at least one hardware processor; and
a non-transitory computer-readable medium encoding instructions of a computer-aided design or manufacturing program for specifying roughing operations for computer-controlled manufacturing of a part, the instructions being configured to cause the data processing apparatus to
obtain a three dimensional model of the part, a three dimensional model of a workpiece from which to machine the part using a computer-controlled manufacturing system, and information regarding different cutting tools and cutting data for the different cutting tools usable in the computer-controlled manufacturing system, wherein the different cutting tools comprise cutting tools having different cutting surface geometries, and the information regarding the different cutting tools comprises a specified final one of the different cutting tools to use when roughing the part from the workpiece,
determine a set of candidate combinations of the different cutting tools to effect the roughing operations by estimating a target machining result for each of multiple, tool-size-ordered lists of the different cutting tools,
generate an expanded set of combinations of the different cutting tools to effect the roughing operations by adding to the set of candidate combinations a set of alternative combinations of the different cutting tools, the alternative combinations being variations of the candidate combinations with each variation having at least one candidate tool being replaced with at least one alternate tool,
populate a multidimensional roughing operations representation vector using the expanded set of combinations of the different cutting tools,
optimize values of the multidimensional roughing operations representation vector for the expanded set of combinations, using a cost function for the target machining result and simulation of the roughing operations, to specify tool selections and operational parameters for the roughing operations, and
provide the specified tool selections and operational parameters for use in roughing the part from the workpiece by the computer-controlled manufacturing system by cutting away portions of the workpiece using the specified tool selections and operational parameters for the computer-controlled manufacturing system.

14. The system of claim 13, wherein the non-transitory computer-readable medium encodes the instructions configured to cause the data processing apparatus to obtain the information regarding the different cutting tools by receiving user input specifying (i) a set of available tools usable by the computer-controlled manufacturing system as the different cutting tools for the roughing operations, and (ii) which of the tools in the set of available tools to use as the specified final one of the different cutting tools to use when roughing the part from the workpiece.

15. The system of claim 14, wherein the target machining result is a total machining time to complete the roughing operations, and the non-transitory computer-readable medium encodes the instructions configured to cause the data processing apparatus to determine the set of candidate combinations by:
estimating machining time for each of the multiple, tool-size-ordered lists of cutting tools to be used for the roughing operations using the cutting data for the different cutting tools; and
selecting a portion of the multiple, tool-size-ordered lists having shortest estimated times to be the set of candidate combinations of the different cutting tools.

16. The system of claim 15, wherein the estimating comprises:
calculating, for each respective tool of the different cutting tools other than the specified final cutting tool, (i) a first time to rough the part from the workpiece using the respective tool, (ii) a respective volume of excess material left on the workpiece after roughing with the respective tool, and (iii) a second time to rough the part using the specified final cutting tool on the workpiece after material removal by the respective tool; and
using at least two of the respective volumes calculated for the respective tools to estimate a time to rough the part using a second of the respective tools on the workpiece after material removal by a first of the respective tools.

17. The system of claim 13, wherein the alternative combinations are variations of the candidate combinations with each variation having at least one candidate tool being replaced with at least one alternate tool that is within a predefined distance of the at least one candidate tool in a tool-size-ordered list of all the different cutting tools, and the non-transitory computer-readable medium encodes the instructions configured to cause the data processing apparatus to generate the expanded set of combinations of the different cutting tools by generating the alternative combinations using an integer distance value for tool replacements applied to the candidate combinations, the integer distance value being the predefined distance having been predefined by a user.

18. The system of claim 13, wherein the non-transitory computer-readable medium encodes the instructions configured to cause the data processing apparatus to populate the multidimensional roughing operations representation vector by populating the multidimensional roughing operations representation vector using the expanded set of combinations of the different cutting tools and one or more roughing parameter alternatives.

19. The system of claim 13, comprising the computer-controlled manufacturing system used to build a physical structure of the part in accordance with the three dimensional model of the part.

20. A non-transitory computer-readable medium encoding instructions operable to cause a data processing apparatus to perform operations for specifying roughing operations for computer-controlled manufacturing of a part, the operations comprising:

obtaining, in a computer-aided design or manufacturing program, a three dimensional model of the part, a three dimensional model of a workpiece from which to machine the part using a computer-controlled manufacturing system, and information regarding different cutting tools and cutting data for the different cutting tools usable in the computer-controlled manufacturing system, wherein the different cutting tools comprise cutting tools having different cutting surface geometries, and the information regarding the different cutting tools comprises a specified final one of the different cutting tools to use when roughing the part from the workpiece;

determining a set of candidate combinations of the different cutting tools to effect the roughing operations by estimating a target machining result for each of multiple, tool-size-ordered lists of the different cutting tools;

generating an expanded set of combinations of the different cutting tools to effect the roughing operations by adding to the set of candidate combinations a set of alternative combinations of the different cutting tools, the alternative combinations being variations of the candidate combinations with each variation having at least one candidate tool being replaced with at least one alternate tool;

populating a multidimensional roughing operations representation vector using the expanded set of combinations of the different cutting tools;

optimizing values of the multidimensional roughing operations representation vector for the expanded set of combinations, using a cost function for the target machining result and simulation of the roughing operations, to specify tool selections and operational parameters for the roughing operations; and providing the specified tool selections and operational parameters for use in roughing the part from the workpiece by the computer-controlled manufacturing system by cutting away portions of the workpiece using the specified tool selections and operational parameters for the computer-controlled manufacturing system.

* * * * *